United States Patent
Elzinga et al.

(10) Patent No.: US 9,764,836 B1
(45) Date of Patent: Sep. 19, 2017

(54) UNMANNED AERIAL VEHICLE SECURE EGRESS AND INGRESS

(71) Applicant: Amazon Technologies, Inc., Seattle, WA (US)

(72) Inventors: Michael John Elzinga, Woodinville, WA (US); Nathan Michael Paczan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 58 days.

(21) Appl. No.: 14/735,070

(22) Filed: Jun. 9, 2015

(51) Int. Cl.
*B64C 39/02* (2006.01)

(52) U.S. Cl.
CPC ........ *B64C 39/024* (2013.01); *B64C 2201/08* (2013.01)

(58) Field of Classification Search
CPC ............. B64C 39/024; B64F 1/32; B64F 1/36
See application file for complete search history.

(56) References Cited

U.S. PATENT DOCUMENTS

| | | | | |
|---|---|---|---|---|
| 8,511,606 B1* | 8/2013 | Lutke | .................... | B64C 39/028 244/100 R |
| 9,056,676 B1* | 6/2015 | Wang | ........................ | B64F 1/00 |
| 9,139,310 B1* | 9/2015 | Wang | ........................ | B64F 1/36 |
| 9,211,025 B1* | 12/2015 | Elhawwashy | .......... | A47G 29/20 |
| 9,244,147 B1* | 1/2016 | Soundararajan | .......... | G01S 1/44 |
| 9,284,062 B2* | 3/2016 | Wang | ...................... | B64D 39/00 |
| 9,290,277 B2* | 3/2016 | You | .............................. | B64F 1/18 |
| 9,321,531 B1* | 4/2016 | Takayama | ................ | B64D 1/12 |
| 9,387,928 B1* | 7/2016 | Gentry | .................. | B64C 39/024 |
| 9,513,371 B2* | 12/2016 | Zhang | ................... | B64C 39/024 |
| 9,545,852 B2* | 1/2017 | Streett | ................... | B64C 39/024 |
| 2014/0032034 A1* | 1/2014 | Raptopoulos | ........ | G08G 5/0069 701/25 |
| 2014/0303814 A1* | 10/2014 | Burema | ............... | A01B 79/005 701/3 |
| 2015/0158599 A1* | 6/2015 | Sisko | ........................ | B64F 1/32 244/114 R |
| 2015/0175276 A1* | 6/2015 | Koster | ...................... | B64F 1/32 244/114 R |
| 2016/0196756 A1* | 7/2016 | Prakash | ................. | B64C 39/024 701/3 |

* cited by examiner

*Primary Examiner* — Justin Benedik
(74) *Attorney, Agent, or Firm* — Lee & Hayes, PLLC (57) ABSTRACT

This disclosure provides egress and ingress for unmanned aerial vehicles (UAVs) from a fulfillment center (FC) to perform deliveries of products and return to the FC from such deliveries while providing minimal exposure of an interior of the FC. The UAV may be used to deliver the cargo from the FC to a destination, and then return to the FC to retrieve other cargo for another transport to another destination. In some embodiments, departing UAVs may be launched from the FC through a launch bay and returning UAVs may land upon a conveyance system to await being transported back into the FC. A flight coordinator may also provide assignments to the UAV based upon a current state of the UAV and other nearby UAVs and also based on a current order backlog of the FC and/or other considerations.

20 Claims, 8 Drawing Sheets

UNMANNED AERIAL VEHICLE SECURE EGRESS AND INGRESS

BACKGROUND

Electronic commerce (E-commerce) as an industry has grown significantly as many consumers have begun to utilize the internet as their preferred source of making commercial purchases due to the ease of locating and comparing items and/or retailers online. Furthermore, the convenience of having orders delivered directly to their home or place of business, especially when expediently delivered, adds to the attractiveness of E-commerce. Currently, the majority of deliveries are conducted manually by driving delivery vehicles and delivering packages door-to-door in person. However, the unmanned aerial vehicle (UAV) has great potential as an expedient and energy-efficient vehicle for transporting products ordered by an end consumer via an electronic marketplace and delivered from a fulfillment center (FC) to the location of the end consumer. For example, upon receiving an order for a product, a UAV may be loaded with the product as cargo and then may depart from the FC to perform the delivery before returning to the FC.

FCs often house proprietary fulfillment technology from which a competitive advantage is derived and which competitors may wish to examine. For example, a particular retailer's fulfillment systems may be developed and continuously refined over many years through significant investment allowing them to fulfill orders with minimal order processing cost.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure provides systems, apparatuses, and methods for coordinating egress and ingress for unmanned aerial vehicles (UAVs) from a fulfillment center (FC) to perform deliveries of products and return to the FC from such deliveries. It is an object of the disclosure to minimize unwanted exposure of an interior of the FC while UAVs exit and enter the FC. Although a traditional FC such as a large warehouse with an inventory and an inventory picking staff is contemplated herein, the FC may also be a mobile FC such as a cargo van or truck or any other apparatus or building suitable for storing at least some inventory and at least one UAV for delivering the inventory. The unwanted exposure could be that of harmful environmental elements such as wind, rain, or dust. Furthermore, the unwanted exposure could be visible exposure such as that of a competitor performing corporate espionage by attempting to view proprietary technology internal to the FC such as proprietary logistics and fulfillment systems.

In various embodiments, a proximately triggered synchronized UAV egress and ingress system may include a launch bay which further includes an aperture between an interior side and an exterior side of an FC, (i.e. launch bay aperture). As used herein, the synchronized UAV egress and ingress may be described or referred to in the context of egress only or ingress only, but it should be appreciated that any embodiment described herein may be used for egress, ingress, or both. In one implementation, the synchronized UAV egress system includes a door that is movably coupled to the launch bay so that the door obstructs (e.g. blocks unauthorized traffic, or visibility, or both through the launch bay aperture) the launch bay aperture when in a first position and does not obstruct the launch bay aperture upon moving into a second position thereby providing clearance for a UAV to egress the FC through the launch bay aperture. In some embodiments, the synchronized UAV egress system further includes a launch receptacle which is configured to receive a UAV loaded with cargo for delivery and to propel the UAV toward the launch bay, and further includes a trigger mechanism configured to cause the door to move into the second position upon physical contact with the launch receptacle. When the launch receptacle contacts the trigger mechanism, causing the launch bay to open, the launch receptacle may be propelling the UAV with sufficient velocity to assist the UAV in reaching a cruising altitude for sustained flight without the use of onboard resources, e.g. battery life. Exemplary systems and processes for assisting a UAV in reaching cruising altitude are disclosed in, but are not limited to, those described in U.S. patent application Ser. No. 14/501,702 which is herein incorporated by reference in its entirety. In various embodiments, the synchronized UAV egress system does not include a launch receptacle.

In accordance with some embodiments, a remotely triggered synchronized UAV egress and ingress system may include a large disk with one or more apertures (i.e. disk apertures) therein which are configured to align with one or more apertures of the launch bay (i.e. launch bay apertures) when the large disk is rotated into one or more particular rotational orientations. The disk aperture(s) on the disk may be the same shape and size as the launch bay aperture (s) in the launch bay such that the disk rotates and stops at one or more particular orientations to enable the UAVs to egress and/or ingress to or from the FC. Alternatively, the disk apertures may be shaped such that the launch bay apertures are completely unobstructed for a period of time as the disk is rotating through an angular range. For example, the disk apertures may be configured so that the disk does not need to stop at a particular orientation for the launch bay apertures to remain unobstructed, but rather the disk begins to rotate when the launch bay apertures are obstructed and remains in rotational motion until the launch bay apertures are once again obstructed. For example, in an embodiment where the disk has two disk apertures oriented at 180 degrees from one another, the disk may continuously rotate exactly 180 degrees each time the launch bay apertures are to be unobstructed and the launch bay apertures may remain unobstructed from, for example, after the first 10 degrees of rotation until the last 10 degrees of rotation so that the launch bay apertures are uncovered through 160 degrees of the 180 degrees of rotation.

In some embodiments, a synchronized UAV ingress system may include an ingress conveyance upon which an ingressing UAV may land prior to being transported into the FC. As used herein, the term "conveyance" shall include conveyer belts, robotic arms, wheeled carts, or any other type of mechanism, automated or not, capable of moving or conveying cargo (i.e., a UAV) from one place to another. The ingress conveyance may include a plurality of designated landing locations which are tagged for identification by ingressing UAVs. For example, the UAVs may be equipped with a form of computer vision which is capable of recognizing a plurality of images existing on the conveyance such as, for example, a white circle enclosing a number identifying the landing location. Such an embodiment may be useful by providing the UAV with an identifiable marker to track and hover above while landing even while the conveyance is in motion, e.g. a UAV may be unable to track the motion of the conveyance if the conveyance is a uniform color or is otherwise untagged; however, with a tagged conveyance in ingressing UAV may track and match the absolute velocity of the conveyance so that the relative horizontal velocity of the UAV with respect to the conveyance is roughly zero while the UAV lands on the moving conveyance. In other embodiments, the conveyance does not include any designated landing locations but rather the UAVs are configured to identify a portion of the conveyance which is clear to land upon. Upon a UAV landing on the ingress conveyance, the UAV may be transported into a sensory range of one or more sensors which verify that the UAV is authorized to enter the FC prior to unblocking the launch bay and transporting the UAV into the FC. The use of a conveyance for ingressing UAVs may be beneficial due to the irregular timing which UAVs may return to the FC from a delivery, e.g. UAVs will likely return to the FC whenever a delivery has been completed which may occur at less regular intervals than UAVs can be loaded with cargo for delivery.

In some embodiments, a synchronized UAV egress and ingress system may include a plurality of launch bay apertures which may be selectively obstructed or unobstructed by a main flight controller which also provides ingress and egress assignments to a plurality of UAVs. The flight coordinator may provide an egress assignment to UAVs loaded with cargo for delivery including an instruction to egress through a specified launch bay aperture and/or a delivery assignment to deliver the cargo to a particular location based upon order information. The flight coordinator may also provide an ingress assignment to UAVs returning from delivery assignments and/or obtain identification information from the UAVs prior to opening (e.g. ceasing to obstruct) a launch bay aperture for the UAVs to ingress through thereby preventing unauthorized entry to the FC. Furthermore, the flight coordinator may determine a health status of the UAVs and/or battery status of the UAVs and respond by providing a maintenance assignment, e.g. directing the UAV to report to a maintenance area, and/or a battery replenishment assignment. In various embodiments, the synchronized UAV egress and ingress system, or flight controller thereof, may establish a communication link with the UAVs to send and receive information, such as ingress/egress assignment data, UAV identification data, flight plan data and/or other types of data.

In some embodiments, the synchronized UAV egress system may include a revolving-type door which enables continuous egress and ingress from an FC by a plurality of UAVs while minimizing unwanted exposure to the interior of the FC. In such embodiments, the revolving-type door may be enclosed in a pair of shields, e.g. partial circular shaped shields which covers a portion of the revolving-type door, which prevent external exposure such as a line of sight from the exterior of the FC to objects within the FC at all times during its continuous operation. These embodiments allow for uninterrupted and continuous fulfillment operations with minimal or no exterior exposure (e.g., line of sight). In such embodiments, the revolving-type door may include a constantly horizontal platform, e.g. a platform which hangs from a rotational axis to remain horizontal, upon which an egressing UAV may rest until cleared for take-off and/or in ingressing UAV may land to be carried into the FC. As ingressing UAVs await for an open platform to land upon, the ingressing UAVs may enter and wait in one or more ingress staging areas in which the UAVs may hover and/or land to conserve energy.

The techniques, apparatuses, and systems described herein may be implemented in a number of ways. Example implementations are provided below with reference to the following figures.

Figure 1:
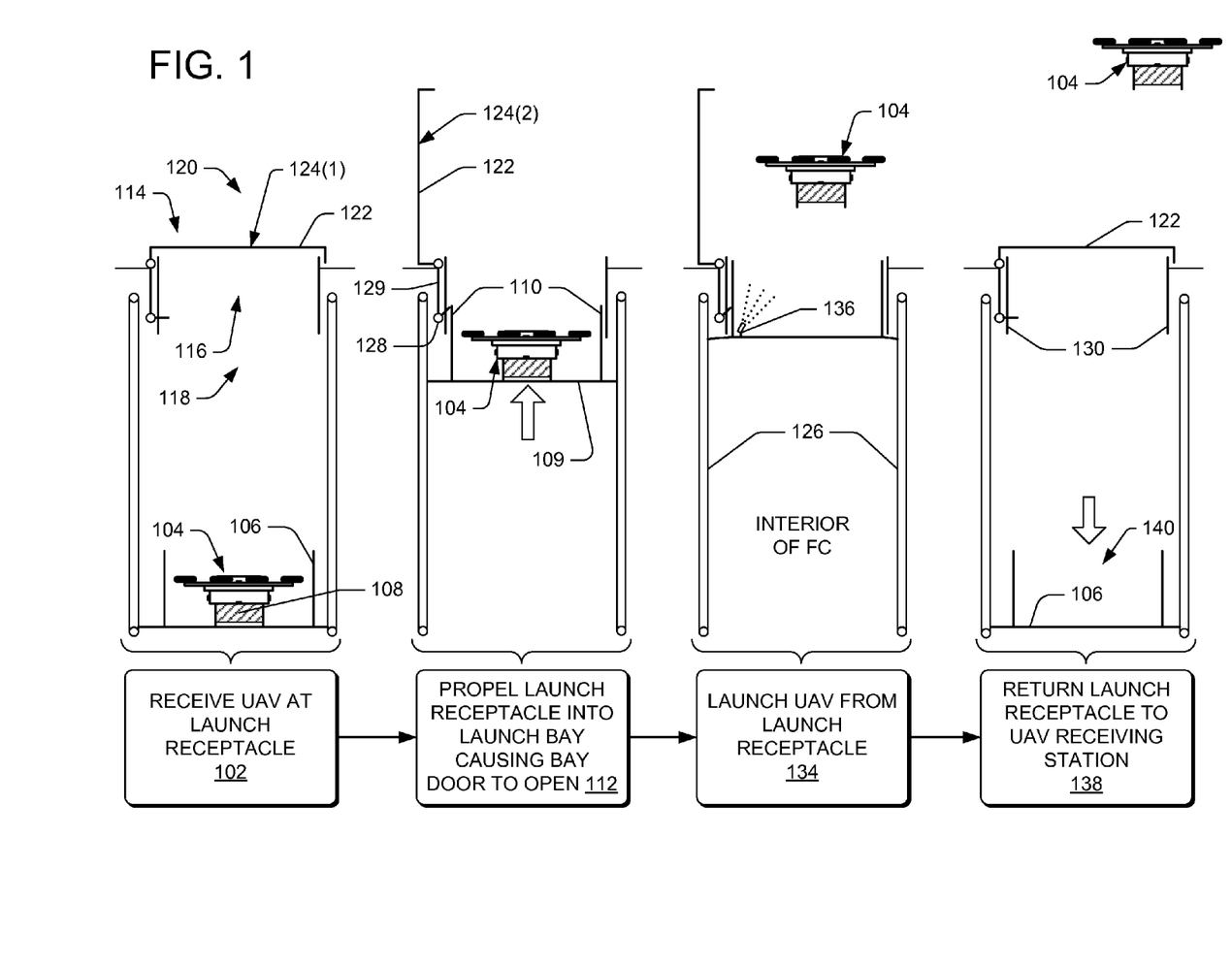
FIG. 1 is a pictorial flow diagram that shows an illustrative process of providing proximately triggered synchronized egress, from within a fulfillment center (FC), for an unmanned aerial vehicle (UAV) loaded with cargo to be delivered to an end consumer.

FIG. 1 is a pictorial flow diagram that shows an illustrative process of providing proximately triggered synchronized egress, from within a FC, for a UAV loaded with cargo to be delivered to an end consumer. The order of the blocks below is not limiting, and thus the operations associated with the blocks below may be performed in a different order and/or some operations may be performed in parallel with other operations. Furthermore, various elements may be labeled only once despite being shown multiple times in the pictorial flow diagram and/or various elements may be shown only once where most applicable for explanation purposes.

At a block 102, a UAV 104 may be received at a launch receptacle 106. For example, the UAV may be loaded with a cargo 108 corresponding to a product to be delivered. The launch receptacle 106 may be configured to receive a single UAV 104 or a plurality of UAVs. Furthermore, the UAV 104 may be loaded with the cargo 108 while in the launch receptacle 106 or prior to being received at the launch receptacle 106. In an illustrated embodiment, the launch receptacle 106 includes both a bottom 109 and sidewalls 110 partially enclosing the UAV 104.

The UAV 104 may be a winged-craft, a rotor-craft, or hybrid aircraft that is capable of transporting cargo by air from an origination location (e.g., at a fulfillment center or near a fulfillment center) to a destination and returning to the origination location. The UAV 104 may be powered by rechargeable batteries that supply power to electric motors that cause rotation of a plurality of rotors. However, the UAV 104 may be powered by other energy sources, such as fuel.

At block 102 of the illustrative process, the FC is secured in that a launch bay aperture 116 is obstructed by a door 122. For example, the interior of the FC is not viewable from the exterior of the FC such as, for example, by an industrial spy attempting to discover proprietary information housed within the interior of the FC. Furthermore, in various embodiments, the door 122 is also configured to seal environmental elements out of the interior of the FC, e.g. rain or wind or dust.

At block 112, the launch receptacle 106 may be propelled toward and/or into a launch bay 114 which includes a launch bay aperture 116 between an interior side 118 and an exterior side 120 of the launch bay 114. The launch bay 114 may include the door 122 with the door 122 being movably coupled to the launch bay 144 which obstructs the launch bay aperture 116 when in a first position 124(1) and, upon moving into a second position 124(2), ceases to obstruct the launch bay aperture 116 thereby enabling the UAV 104 to egress from (or ingress into) the interior of a FC. Various ways of propelling the launch receptacle 106 may be utilized such as, for example, coupling the launch receptacle 106 to one or more cables 126 which form a part of a pulley system. Other exemplary systems, apparatuses, and processes for propelling the launch receptacle 106 are disclosed in, but are not limited to, those described in U.S. patent application Ser. No. 14/501,702 which is herein incorporated by reference in its entirety.

The launch bay 114 may further include a trigger mechanism 128 which is at least partially disposed within a path that the launch receptacle 106 travels through as it is propelled toward the launch bay 114. The trigger mechanism 128 may cause the door 112 to move into the second position, e.g. by swinging open or rotating into an open position, upon being contacted by the launch receptacle 106. The trigger mechanism 128 may optionally include a mechanical linkage 129 which transfers a force applied by the launch receptacle 106 to the trigger mechanism 128, upon contacting the trigger mechanism 128, to the door 122 to forcibly cause the door 122 to move from the first position 124(1) into the second position 124(2). Alternatively, the trigger mechanism 128 may include a proximity switch, a limit switch, or both, which senses (with or without physically contacting the launch receptacle 106) that the launch receptacle 106 has reached a predetermined location and then sends a signal to cause the door 122 to open. For example, the launch receptacle 106 may contact a limit switch, which upon being contacted, sends a signal to a door controller that causes the door 122 to move to the second position 124(2) via a pneumatic, a hydraulic, or an electric system. For example, the door controller may be similar to a door controller module discussed below in that it may utilize software as an intermediary to sending the signal or the door controller may include simple and direct circuitry such as a limit switch which sends a signal directly to an electric relay switch which in turn relays electric power to a motor which causes the door 122 to immediately swing open. Alternatively and/or in conjunction, pneumatic circuitry and/or hydraulic circuitry may be utilized by the door controller.

In various embodiments, a spring mechanism configured to forcibly bias the door into the first position 124(1) may be optionally included. For example, in an embodiment which includes a mechanical linkage 129 which transfers a force applied to the trigger mechanism 128 by the launch receptacle 106 to the door 122, there may be ample force to move the door from the first position 124(1) into the second position 124(2) due to an excess of power available from the particular propulsion system selected to propel the launch receptacle 106. However, due to various factors such as internal friction within the mechanical linkage 129, the door 122 may not naturally return from the second position 124(2) to the first position 124(1) upon the launch receptacle 106 ceasing to contact the trigger mechanism, e.g. upon the launch receptacle 106 being retracted from the launch bay 114. Including a spring mechanism which biases the door 122 into the first position 124(1) prevents the door 122 from remaining in the unobstructed second position 124(2) thereby further preventing unwanted external exposure. In various embodiments, one or more sensors may be included which determine and indicate whether the door 122 fails to toggle between the first position and the second position.

In some embodiments, the launch receptacle 106 is configured to shieldably mate with the launch bay 114 to shield the interior side 118 from one or more points of view from the exterior side 120. For example, the side walls 110 of the launch receptacle 106 may enter into a shield portion 130 of the launch bay 114 which extends past the trigger mechanism (i.e. extends below the trigger mechanism in the illustrated embodiment) so that the side walls 110 fit within the shield portion 130 prior to the launch receptacle 106 contacting the trigger mechanism 128 thereby causing the door 122 to open. In some embodiments, the shieldably mating may include mating tightly, e.g. by one or more rubber weather seals between the shield portion 130 and the side walls 110, to prevent exposure of the interior of the FC to unwanted environmental elements such as rain and/or wind and/or dust. In other embodiments, the shieldably mating may include loosely mating, e.g. mating by a predetermined clearance which does not completely prevent exposure to unwanted environmental elements but may prevent unwanted visibility exposure from persons and/or cameras at the exterior of the FC. For example, because the interior of the FC may house proprietary fulfillment systems which a business' competitors may attempt to discover, it may be necessary to shield the interior of the FC from an industrial spy exterior to the FC, e.g. a competitor's UAV equipped with a video recorder or high speed camera.

At block 134, the UAV 104 is launched from the launch receptacle 106 while the door 122 is in the second position 124(2). Following the launch, the UAV 104 may commence a delivery of the cargo 108 pursuant to a retail order. In some embodiments, one or more sensors 136 may determine whether the UAV 104 has fully egressed to the exterior side of the launch bay 114 and is clear of a movement path (not labeled) of the door 122 between the first position 124(1) and the second position 124(2) so that the door 122 does not swing (or otherwise move) into contact with the UAV 104. In some embodiments, the sensors 136 may include sonar technology, Doppler technology, passive infrared (PIR) technology, or any other suitable type of sensor for determining a presence (or lack thereof) of the UAV 104. Alternatively, the sensors 136 may include a near field communication (NFC) device which may establish a communication link between with the UAV 104 and may, optionally, upload data to the UAV 104 such as flight plans or delivery assignments, and/or receive data from the UAV 104 such as confirmation that a pre-flight systems check has been performed and the UAV is prepared to commence a delivery which may serve as a prerequisite to the propelling the launch receptacle 106 at block 112. Furthermore, in embodiments equipped with an NFC device, the determining whether the UAV 104 has fully egressed may optionally include waiting for the NFC communication link to be lost, e.g. by the UAV 104 moving out of range as the UAV flies away. Any particular way of determining whether the UAV 104 has fully egressed to the exterior side of the launch bay 114 may be used in conjunction with one or more other ways of determining whether the UAV 104 has fully egressed to the exterior side of the launch bay 114 to provide redundancies in the event of a false determination.

At blocks 112 and 134 of the illustrative process, the FC is unsecure in that a launch bay aperture 116 is no longer obstructed by the door 122 in order to allow for egress, ingress, or both, of the FC by one or more UAVs. However, at blocks 112 and 134, the FC remains visibly secure. For example, the interior of the FC is still not viewable from the exterior of the FC such as, for example, by an industrial spy attempting to discover proprietary information housed within the interior of the FC.

At block 138, the launch receptacle 106 is returned to the location where the UAV was originally received at block 102, e.g. a UAV receiving station 140 and/or egress stating station. Subsequently, the launch receptacle 106 is loaded with another UAV to be launched. Although the foregoing embodiments and features have been discussed with regards to an exemplary egress process, it is within the scope of the present disclosure to provide for UAV ingress utilizing the foregoing embodiments and features. For example, at block 134 an ingressing UAV may also be assigned to land within the launch receptacle 106 while the door 122 is open and at block 138 an ingressing UAV may be transported into the FC. The security of the FC at block 138 is similar to the security of the FC discussed in relation to block 102.

Figure 2A:
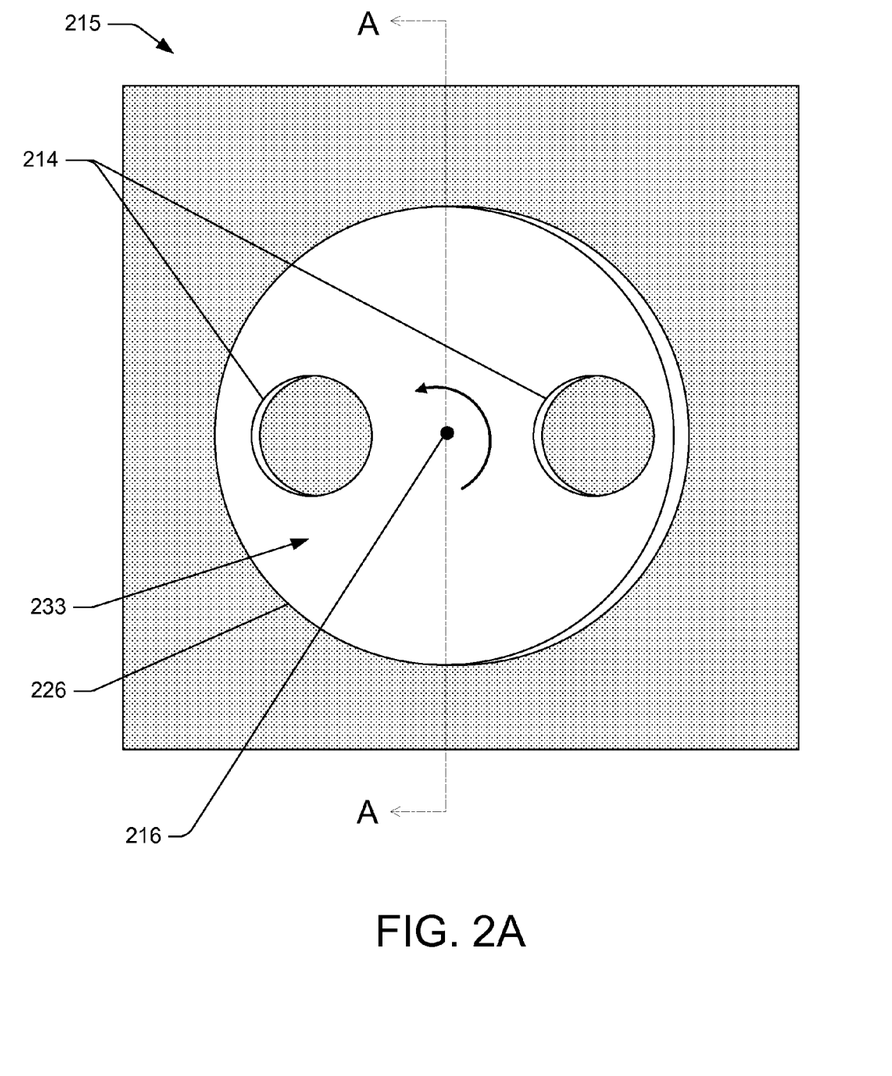
FIGS. 2A and 3A are front views of an illustrative apparatus for providing remotely triggered synchronized egress, from within a FC, for an unmanned aerial vehicle (UAV) loaded with cargo to be delivered to an end consumer.
Figure 3A:
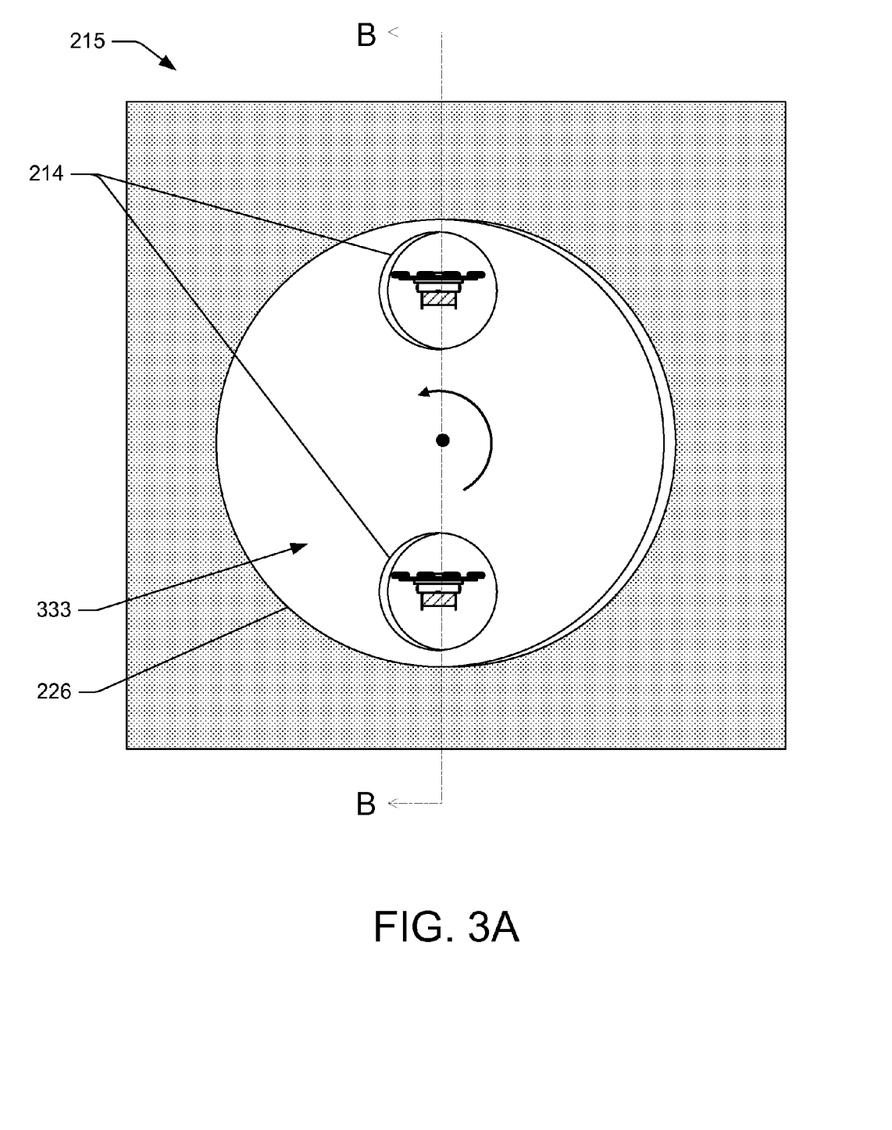

FIGS. 2A and 3A are front views of an apparatus for providing remotely triggered synchronized egress, from within a FC, for an unmanned aerial vehicle (UAV) loaded with cargo to be delivered to an end consumer.

Figure 2B:
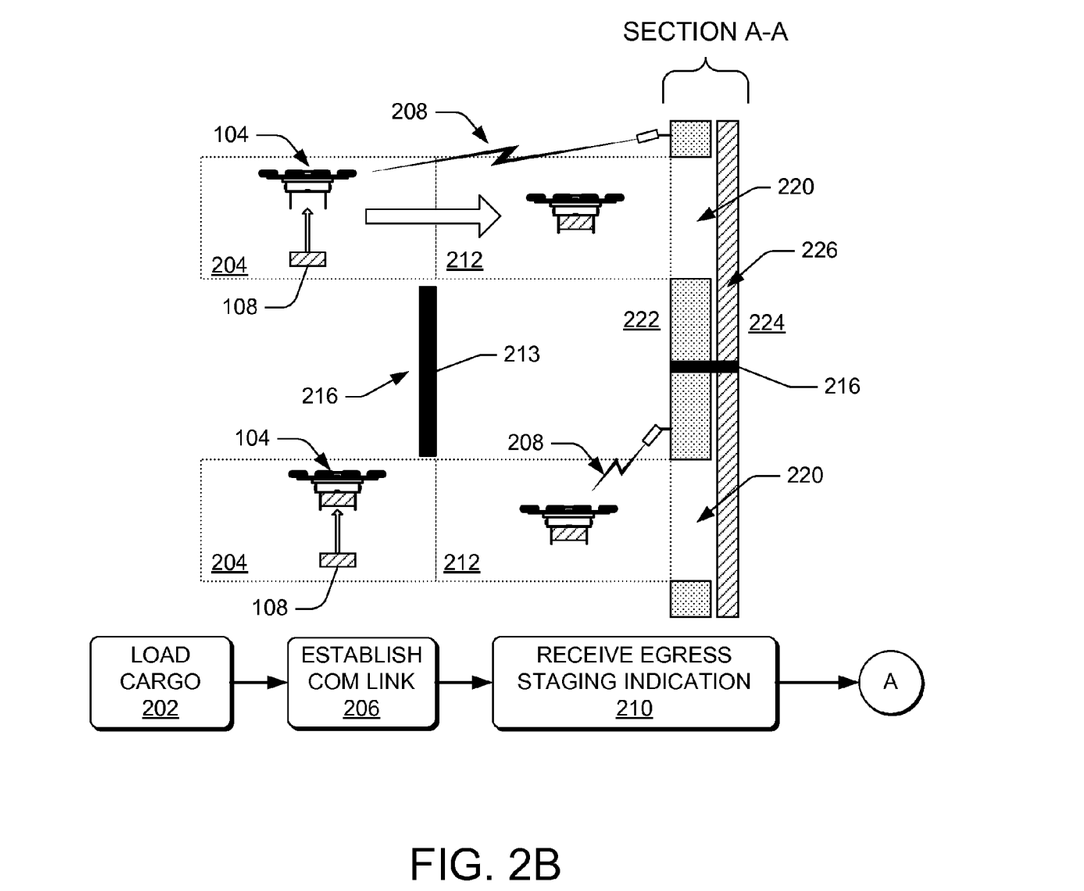
FIGS. 2B and 3B are pictorial flow diagrams that show an illustrative process of providing remotely triggered synchronized egress shown in relation to cross-sectional views of the apparatus shown in FIGS. 2B and 3B, respectively.
Figure 3B:
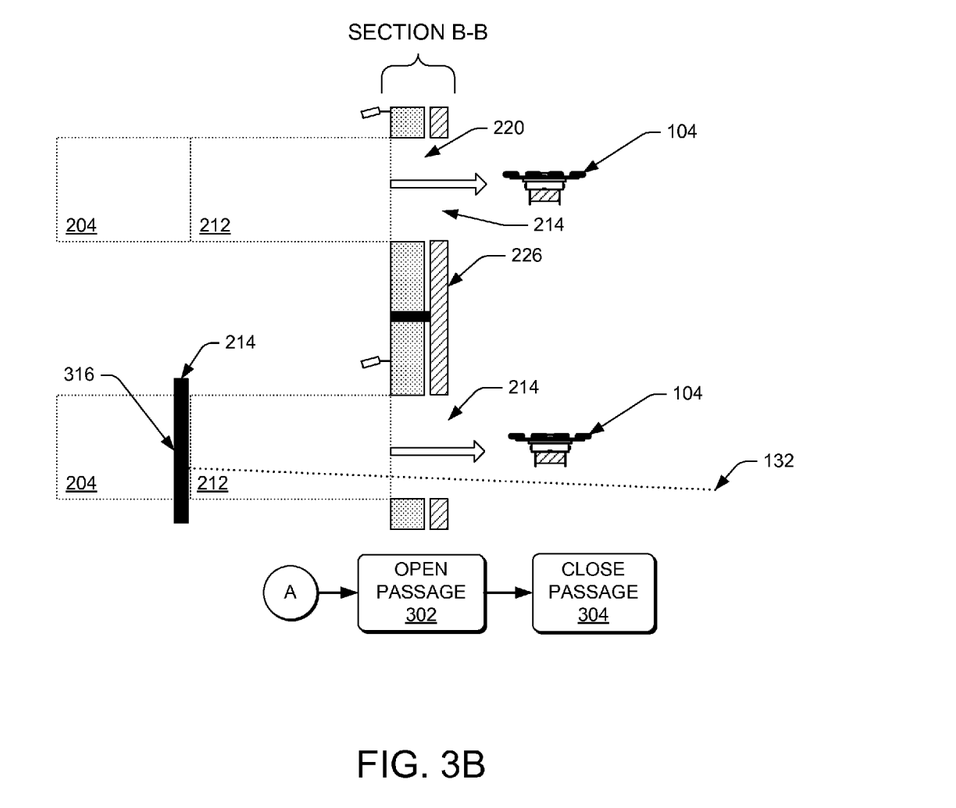

FIGS. 2B and 3B are pictorial flow diagrams that show an illustrative process of providing remotely triggered synchronized egress shown in relation to cross-sectional views of the apparatus shown in FIGS. 2B and 3B taken along the cross-sectional line A-A and cross-sectional line B-B, respectively. Once again, the order of the blocks below is not limiting, and thus the operations associated with the blocks below may be performed in a different order and/or some operations may be performed in parallel with other operations. Furthermore, various elements may be labeled only once despite being shown multiple times in the pictorial flow diagram and/or various elements may be shown only once where most applicable for explanation purposes.

At a block 202 of FIG. 2B, the UAV 104 may be loaded with the cargo 108 for delivery by the UAV 104 within a sensitive area 204 (shown with dotted line boundary) which may house potentially sensitive and/or proprietary information. The cargo 108 may be selected at the FC for delivery to a destination by the UAV 104. The cargo 108 may be coupled to or loaded onto the UAV 104 within the FC at block 202. In some embodiments, the objective of the UAV 104 is to transport the cargo 108 between designated areas including an FC and an end customer at a destination. For example, a typical FC stores a vast amount of regionally-specific demand-driven cargo 108. In this context, the cargo 108 may include of any tangible commodity received from a supplier. The cargo 108 may come in various shapes, sizes, and weights. The FC is tasked with receiving and storing the cargo 108 from various suppliers and then distributing the cargo 108 to destinations (e.g., locations of end users and/or customers).

At block 206, a communication (COM) link 208 may be established with the UAV 104 to facilitate an automated egress from the FC. In some embodiments, the COM link 208 is established through one or more Local Area Networks (LANs) such as, for example, a private or public Wi-Fi network within the FC to which the UAV 104 is configured to connect. In various other embodiments, the COM link 208 may include Bluetooth® technology and/or Near Field Communication (NFC) technology and/or any other type of suitable communication protocol whether currently existing or subsequently developed. In various embodiments, the process of providing remotely triggered synchronized egress for a UAV may include determining via the COM link 208 whether the UAV 104 has received delivery instructions associated with the cargo 108. Delivery instructions may include, for example, information associated with a drop-off location for the cargo (e.g. an end consumer's home address or place of business), information associated with airspace restrictions within a probable flight corridor (e.g. restricted air space near government facilities and/or airports), and/or information associated with a designated flight corridor for at least a portion of the delivery flight (e.g. instructions to enter a particular merging pattern upon returning to the FC to avoid collisions with other UAVs). Upon determining that the UAV 104 has not received delivery instructions, an exemplary process may include searching a database for and/or generating delivery instructions for the UAV 104 and providing them to the UAV 104. In some embodiments, establishing the COM link 208 may include establishing multiple COM links at various stages of a delivery process, e.g. a Wi-Fi COM link may be used for UAVs within the FC while a cellular network COM link may be used to send and receive info to and from UAVs which are out performing a delivery. In some embodiments, the process of providing remotely triggered synchronized egress for a UAV may include verifying via the COM link 208 whether the UAV 104 has passed a pre-flight inspection to ensure that the UAV is currently capable of delivering the cargo. For example, it may be verified that the UAV has sufficient battery to perform the delivery based on the range of the particular delivery, for example if the UAV battery is only 45% charged resulting in a current range of 4 miles while the particular delivery is 5 miles round trip the automated egress of that UAV may be postponed while the battery is charged or replaced. For a further example, it may be verified that the UAV is capable of sending and receiving data via a cellular network (or other suitable long range network) to ensure the UAV 104 will be able to receive order status updates such as real time delivery location based on an order customer's real time location, e.g. UAV 104 may receive updated delivery information based upon real time GPS data obtained from an end consumer's mobile device.

At block 210, an indication may be received that the UAV has entered an egress staging area 212 (shown with dashed line boundary). In some embodiments, the indication is received directly from the UAV 104 via the COM link 208, e.g. through a Bluetooth or Wi-Fi signal. For example, the UAV 104 may be configured to track its location and send the indication via the COM link 208 upon being loaded with a cargo for delivery, receiving delivery instructions, undergoing a pre-flight inspection, and/or entering the egress staging area 212. In some embodiments, the egress staging area 212 is located proximate to a launch bay aperture 220 between the interior side 222 and exterior side 224 of the launch bay 215. The egress staging area 212 may include one or more platforms upon which the UAVs may land while waiting to egress. Furthermore, the UAVs may hover within the egress staging area 212 or may fly through the egress staging area 212 without stopping prior to egressing from the facility. In some various embodiments, the indication that the UAV has entered the egress staging area 212 may be received through one or more sensors such as a sonar sensor, motion sensor, or PIR sensor, or any other suitable type of sensor for determining a presence (or lack thereof) of the UAV 104.

At block 202 of the illustrative process, the FC is secure in that a launch bay aperture 220 is obstructed by a door 122. For example, the interior of the FC is not viewable from the exterior of the FC such as, for example, by an industrial spy attempting to discover proprietary information housed within the interior of the FC. Furthermore, in various embodiments, the door 122 is also configured to seal environmental elements out of the interior of the FC, e.g. rain or wind or dust.

Referring particularly now to FIGS. 3A and 3B, at block 302 the automated egress from the FC may include causing the launch bay aperture 220 to change from a closed state to an open state to enable the UAV 104 to egress from the FC. As shown in FIGS. 2A-3B, in some embodiments the door 226 includes one or more disk apertures 214 which are offset from an axis of rotation 216 and are configured to cover the launch bay aperture 220 when in the first position 233 (as shown in FIGS. 2A and 2B) and to uncover the launch bay aperture 220 upon rotation into the second position 333 as shown in FIGS. 3A and 3B. In particular, FIG. 2B illustrates such an embodiment in a closed position whereas FIG. 3B illustrates the same embodiment in an open position upon the door having rotated into the second position 333 thereby uncovering the launch bay aperture 220. Although the illustrated embodiment includes two disk apertures 214, it should be appreciated that any number of disk apertures may be incorporated depending on the FC and UAV size, the specific ingress/egress needs, and/or any other applicable design considerations. At block 304, the launch bay aperture may be closed in response to determining that the UAV has egressed through the launch bay aperture to commence delivery of the cargo. Various embodiments may use various methods of determining that the UAV has egressed the FC. For example, some embodiments may make this determination by receiving a communication from the UAV via the COM link 208, including a newly established cellular COM link (not illustrated) once the UAV 104 has traveled out of range of a short range COM link, out of range of a WLAN.

With particular reference to FIGS. 2B and 3B, in some embodiments the automated egress from the FC includes causing a shield 213 to move from a first position 216 to second position 316 to shield potentially sensitive information (e.g. information within sensitive area 204 that is within the FC from view points from the exterior of the FC through the launch bay aperture 220. For example, with particular reference to FIG. 3B an industrial spy at exterior location 132 may attempt to view the interior of the FC to discover sensitive information but will have its viewpoint blocked by the shield 213. The shield 213 may be a curtain which is lowered or slid into place, a solid door such as a panel garage door, or any other device suitable for serving as a shield. In some embodiments, the shield 213 is stationary (i.e. not movable) such a wall. For example, egressing UAVs may be required to either fly or be transported from sensitive area 204 around one or more physical non-movable barriers which serve as the shield 213.

With particular reference to FIG. 2B, in various embodiments the causing of the launch bay aperture 220 to change from a closed state to an open state to enable the UAV 104 to egress from the FC may occur contemporaneously with the UAV 104 flying toward the launch bay aperture 220. For example, the UAV 104 may be loaded with the cargo at block 202 while simultaneously having the COM link 208 established therewith at block 206. Next the UAV 104 may fly by its own power from the sensitive area 204 to the egress staging area 212, while immediately subsequent the shield 213 is moved into the second position 316, and again immediately subsequent the launch bay aperture 220 is caused to open thereby allowing the UAV 104 to egress from the FC by flying through the launch bay aperture by its own power. Alternatively, with particular reference to FIG. 1, in various embodiments the causing of the launch bay aperture 220 to change from a closed state to an open state occurs contemporaneously with the UAV 104 being propelled toward the launch bay aperture by a force generated external to the UAV 104. For example, the UAV 104 may be loaded with cargo and received in the launch receptacle 106 and the force external to the UAV (represented by the outlined arrows) may be contemporaneously exerted on the launch receptacle and/or the UAV 104 while the door 226 is rotating from the first position 233 to the second position 333. Exemplary systems of applying a force to the launch receptacle and/or UAV are not limited to those disclosed herein but also include those described in U.S. patent application Ser. No. 14/501,702.

At block 302 of the illustrative process, the FC is unsecure in that the launch bay aperture 220 is no longer obstructed by the door 226 in order to allow for egress, ingress, or both, of the FC by one or more UAVs. However, at block 302 the FC may remain visibly secure due to the optional inclusion of the shield 213. For example, the interior of the FC is still not viewable from the exterior of the FC such as, for example, by an industrial spy attempting to discover proprietary information housed within the interior of the FC.

Figure 4:
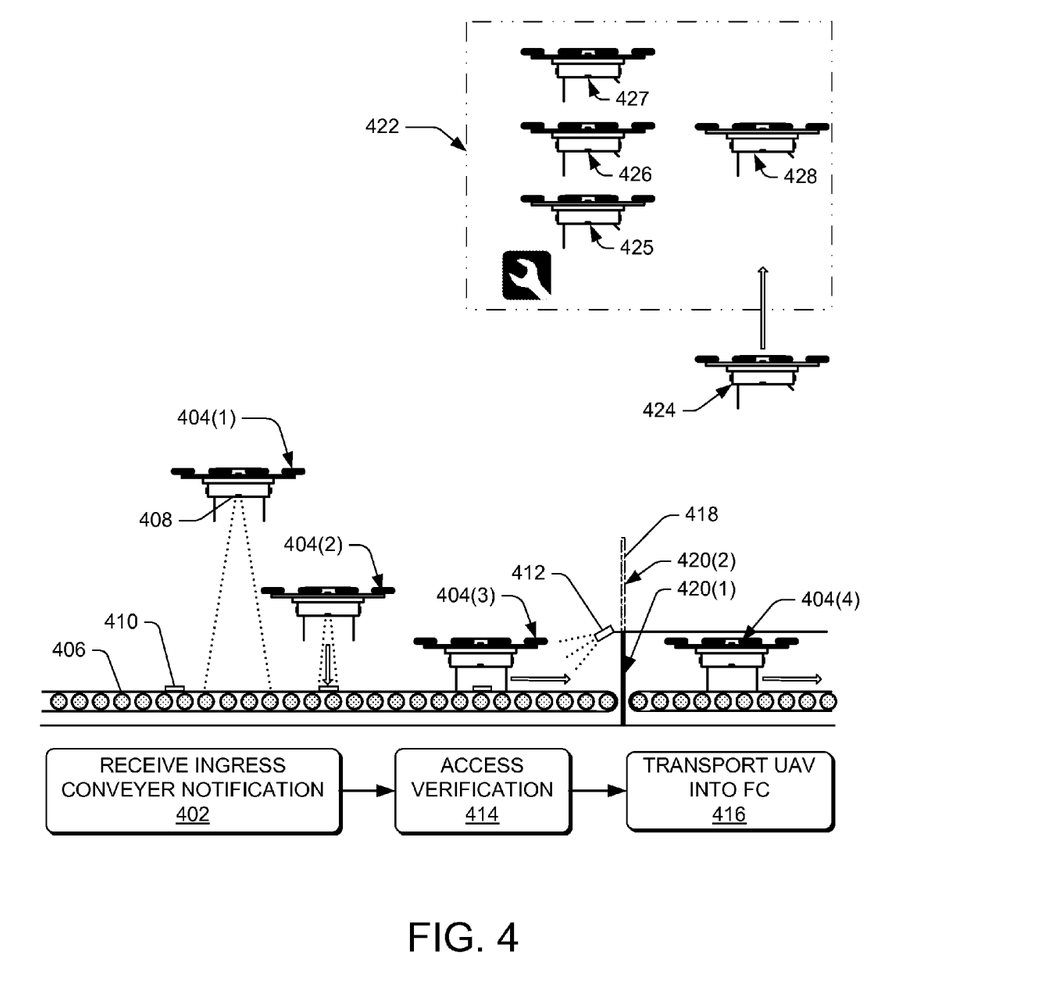
FIG. 4 is a pictorial flow diagram that shows an illustrative process of providing automated UAV ingress, into an FC, for returning UAVs while allowing minimal exposure of an interior of the FC.

FIG. 4 is a pictorial flow diagram that shows an illustrative process of providing automated UAV ingress, into an FC, for a UAV returning from a delivery and potentially low on energy. Once again, the order of the blocks below is not limiting, and thus the operations associated with the blocks below may be performed in a different order and/or some operations may be performed in parallel with other operations disclosed herein with regard to other figures.

At block 402, a notification may be received through a communication link that a UAV 404 has landed upon an ingress conveyance 406. For example, in some embodiments a UAV 404 may hover above an ingress conveyance 406 upon which it will land. The UAV 404 may be equipped with one or more sensing devices 408, e.g. computer vision configured to recognize images and/or generate 3-dimensional point clouds of surrounding objects, which the UAV 404 utilizes to land upon the ingress conveyance 406 without colliding with objects, e.g. other ingressing and/or egressing UAVs. In some embodiments, the UAV may be programmed or otherwise instructed to hover at a predetermined altitude above the conveyance, represented by the location of UAV 404(1), while locating a designated landing location 410. Note that UAV 404 is depicted in four locations to represent various stages of ingress, wherein the UAV labeled 404(1) at a first location and so on. The designated landing location 410 may include a visible image, e.g. a circled white number printed on a black conveyance belt, so that the UAV 404 may hover above the conveyance 406 as represented by UAV 404(1) and upon locating an open designated landing location 410 the UAV begins to follow the location 410 by matching the horizontal velocity of the conveyance 406 while reducing its altitude as represented by UAV 404(2) and ultimately UAV 404(3) upon landing. Although the UAV 404 may be capable of landing on the ingress conveyance 406 while in motion, it should be appreciated that the conveyance may also be stationary while the UAV 404 lands thereon. The notification that UAV 404 has landed on the conveyance 406 may come from the UAV 404 and/or from a sensing device 412, e.g. a motion sensing device. In various embodiments, the sensing device 412 is configured to discern between the UAV 404 and other objects such as a pigeon which may land on the conveyance so that the false notifications are avoided.

At block 414, a verification operation may be performed to verify that the UAV 404 is permitted to access the interior of the FC. For example, in the event that an industrial spy successfully lands on the ingress conveyance 406 in an attempt to gain unpermitted access to the FC, the industrial spy will be unable to verify that it is permitted to access the FC and the ingress conveyance 406 may be prevented from transporting the industrial spy into the FC in accordance with block 416. In some embodiments, the verification at block 414 is accomplished by initiation a handshake protocol between the UAV 404 and a control module which requests and receives credentials to identify the UAV 404. The credentials may include a software-based security token, a digital Public Key Infrastructure (PKI) certificate, and/or a private key. Furthermore, the credentials may be configured in such a way that it is tamper-proof and/or tamper-resistant so that it is impractical for unauthorized personnel to alter and/or extract (or otherwise identify) the credentials. In various other embodiments, the verification at block 414 includes using the sensing device 412 to weigh the UAV 404 and match against a predetermined known UAV weight and/or measuring an external property of the UAV 404 such as a unique paint signature measured by a spectrometer.

At block 416, the UAV 404 is transported into the FC by the ingress conveyance 406. This may include moving a door 418 from a first position 420(1), which blocks the conveyance from transporting any items into the FC, into a second position 420(2) which unblocks a launch bay aperture (not labeled) which the UAV 404(4) is shown passing through. In some embodiments, the ingress conveyance 406 is a system of components as opposed to a single conveyance. For example, in the embodiment illustrated in FIG. 4, there are two conveyances shown separated by a gap which enables the door 418 to tightly seal for both security and weather sealing purposes. Furthermore, it should be appreciated that as previously discussed, the door 418 also serves the purpose of preventing the industrial spy from being able to view into the FC to discover potentially sensitive company information such as proprietary logistics or fulfillment systems. While in some embodiments, the verifying access permission at block 414 occurs prior to causing the ingress conveyance 406 to transport the UAV 404 to the interior of the FC, in other embodiments the verifying at block 414 may occur after the transporting at block 416 or may not occur at whatsoever. In some embodiments, one or more maintenance areas 422 is located adjacent and/or proximate to the ingress conveyance 406 for any damaged and/or unhealthy UAVs, e.g. UAVs 424-428, to land within to avoid any interruption in continuous ingress of healthy and functional UAVs, e.g. UAV 404. For example, unhealthy UAV 424 may potentially land incorrectly on the ingress conveyance 406 due to damaged landing equipment, e.g. sensing devices 408, or may otherwise disrupt internal operations of the FC, e.g. jamming in an ingress conveyance system.

Figure 5:
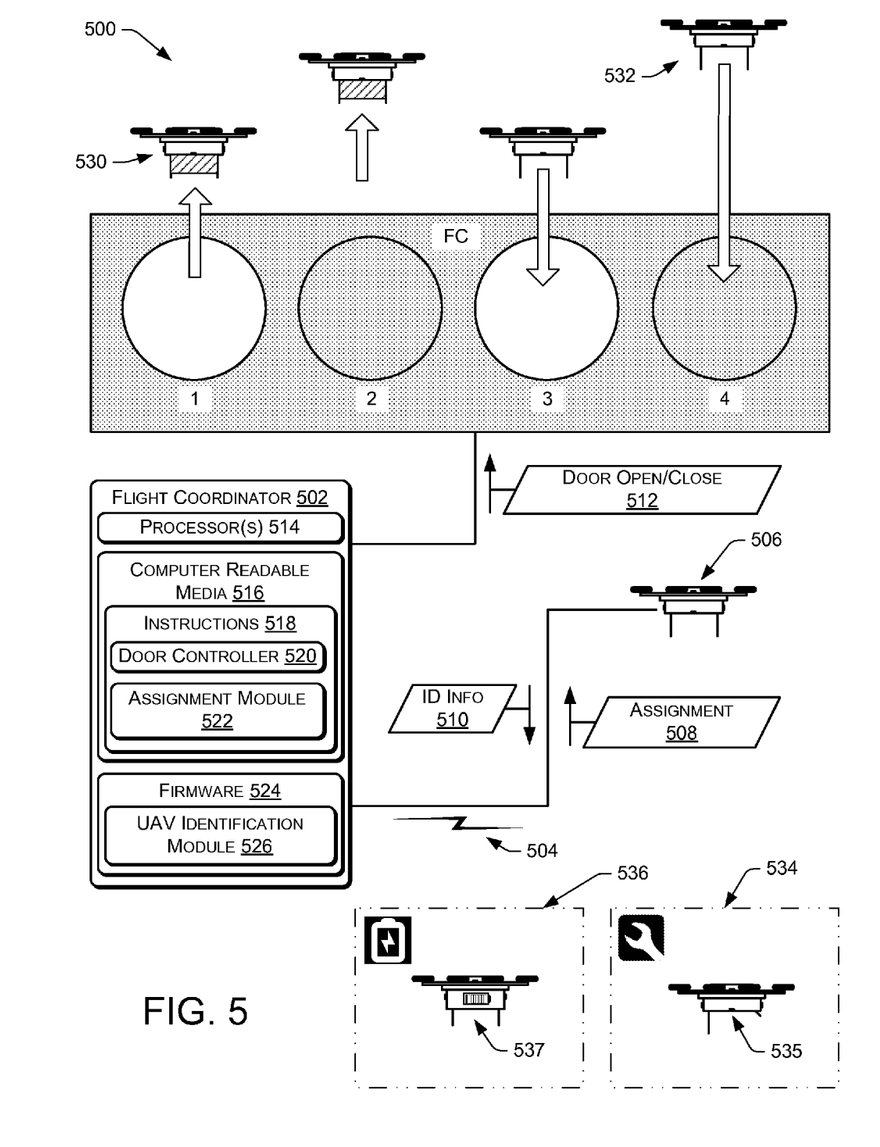
FIG. 5 is a schematic block diagram of an illustrative UAV egress and ingress system to continuously coordinate egress and ingress for a plurality of UAVs.

FIG. 5 is a schematic block diagram of an illustrative UAV Egress and Ingress system 500 to continuously synchronize Egress and Ingress for a plurality of UAVs. The system 500 includes a flight coordinator 502 for controlling and synchronizing a plurality of UAV flights and a plurality of launch bays which are labeled 1-4 (Note that launch bays 1 and 3 are illustrated as open while launch bays 2 and 4 are illustrated as closed). The flight coordinator 502 may establish a communication link 504 with a UAV 506 and provide an assignment 508 to the UAV 506 and/or receive identification (ID) information 510 from the UAV 506. The flight coordinator 502 may also send signals 512 to open and/or close the launch bays 1-4.

The flight coordinator 502 may include one or more processor(s) 514 and/or one or more computer readable media 516. The computer readable media 516 may include volatile storage (e.g., random-access memory) and/or non-volatile memory (e.g., a hard disk or another type of non-volatile memory). The computer readable media 516 may be used to store software instructions 518, such as device drivers, an operating system, and/or software applications that are executable by the processors 514 to perform various functions. The computer readable media 516 may further include a door controller module 520, a UAV assignment module 522, and/or a UAV identification module 526 which may be optionally embedded at least partially in a firmware 524 (e.g. the identification module 526 may be partially or wholly included in the instructions 518). In some embodiments, the flight coordinator 502 may establish a communication (COM) link 504 with UAV 506 to send and/or receive information. In some embodiments, the COM link 504 is established through one or more Wireless Local Area Networks (WLANs) such as, for example, a private Wi-Fi network which the UAV 506 is configured to connect. In some embodiments, the COM link 504 is established through one or more long-range networks such as a cellular network and/or a satellite based connection to enable the COM link 504 to be maintained throughout a delivery which occurs while out of range of a LAN or WLAN. Information sent to the UAV 506 may include various assignments 508 including, but not limited to, egress assignments instructing the UAV 506 to exit through a particular launch bay, ingress assignments instructing the UAV 506 to enter through a particular launch bay, and/or delivery assignments instructing the UAV 506 to commence a delivery to a specific location such as the location of an end consumer.

In providing an exemplary egress assignment in accordance with various embodiments, the flight coordinator 502 may establish a COM link with UAV 530 and send an egress assignment including an instruction to exit the FC through launch bay 1 and/or a particular time to egress and/or an instruction standby in an egress staging area. The flight coordinator 502 may also send a signal, either before or while the UAV 530 is performing the egress assignment, to open the launch bay 1, and then subsequently determine when the UAV 530 has fully completed the egress assignment before sending a signal to close launch bay 1 behind the UAV 530. In some embodiments, the signal to open and close a launch bay is sent immediately prior to and immediately after, respectively, a UAV egresses through the launch bay. In some embodiments, the determination as to whether the UAV 530 has egressed the FC is received as an indication from the UAV 530, e.g. a signal sent from the UAV 530 over a COM link. The flight coordinator 502 may also receive ID information from the UAV 530 to determine information specific to UAV 530, e.g. product delivery information corresponding to the cargo it is loaded with, to provide other corresponding assignment information to UAV 530, e.g. delivery coordinates or special delivery instructions. In various implementations, the flight coordinator 502 may provide an egress staging assignment to a plurality of UAVs to enter into a standby in an egress staging area and, in response to determining that each of the plurality of UAVs is standing by in the egress staging area, providing a plurality of egress assignments to the UAVs. The providing an egress staging assignment may occur prior to the flight coordinator 502 sending a signal to open a launch bay so that the plurality of UAVs may exit the FC within a short span of time to avoid unnecessary exposure time of the interior of the FC, e.g. 20 UAVs may line up in the egress staging area and exit in unison once the launch bay opens.

In providing an exemplary ingress assignment in accordance with various embodiments, the flight coordinator 502 may establish a COM link with UAV 532 and obtain identification information 510 from the UAV 532 to determine whether the UAV 532 is permitted to access the FC, e.g. to ensure that the UAV 532 is not a competitor's UAV attempting to perform industrial reconnaissance. The ID information 510 may include credentials such as a software-based security token, a digital Public Key Infrastructure (PKI) certificate, or a private key. In some embodiments, the UAV 532 may also request identification information associated with the flight coordinator 502 which may optionally be embedded in firmware 524. The flight coordinator 502 may further provide the UAV 532 with an ingress assignment and/or a signal to cause a particular launch bay, e.g. launch bay 4, to open (bay 4 is illustrated as closed). The ingress assignment may include an instruction to enter the FC through a particular launch bay and/or an instruction to report to a maintenance area 534 and/or a refueling station 536 (e.g. a battery charging/replenishment station). The flight coordinator 502 may further determine that the UAV 532 has traveled through the particular launch bay and in response thereto, subsequently, close that launch bay behind the UAV 532.

In some embodiments, the flight coordinator 502 may establish one or more COM links with a plurality of ingressing and/or egressing UAVs and may provide information associated with specific flight corridor to travel within. The specific flight corridor for any one UAV may be based on physical location information and direction of travel information associated with one or more other UAVs in order to coordinate flights such as, for example, to avoid collisions between UAVs and/or other known stationary objects and/or other unrelated aircraft. For example, the flight coordinator 502 may receive a continuous or substantially continuous information feed from UAVs within a predetermined airspace, e.g. within 1 mile of the FC, which includes a physical location obtained from the UAVs' GPS modules as well as a direction of travel. The direction of travel information may be general such as "returning to FC from delivery" and/or "leaving for delivery," or may be specific such as "NE 48 degrees." The physical location information may include both geographical coordinates and/or altitude data. In some embodiments, the flight coordinator 502 may assign all retuning UAVs to merge into one or more designated flight corridor and to stay at all times a specific distance apart on the flight corridor and/or all departing UAVs to merge into one or more other designated flight corridor and to similarly stay at all times a specific distance apart. In providing assignments 508, the flight coordinator 502 may receive human input, may be wholly automated based on one or more algorithms for coordinating a plurality of flights, or a combination thereof.

In some embodiments, the flight coordinator 502 may determine a health status of UAV 506 by receiving health status information via the COM link 508. The health status information may include any information related to the current ability of UAV 506 to perform properly. For example, one or more on-board accelerometers of the UAV 506 may detect an abnormal intensity and/or frequency of vibration while the UAV 506 is flying and/or winds its rotors up from a landed position. Such an abnormal intensity and/or frequency of vibration may indicate that one or more rotors are damaged or otherwise off balance. For another example, the UAV 506 may detect an abnormal heat buildup in an electric motor or an on-board battery. In response to determining that the health status of UAV 506 is above a health threshold, the flight coordinator 502 may provide the UAV 506 with an appropriate assignment for a healthy UAV, e.g. proceed to a refueling station 536 and/or proceed to ingress the FC and receive new cargo associated with next delivery. In response to determining that the health status of UAV 506 is below a health threshold, the flight coordinator 502 may provide the UAV 506 with an assignment to report to a maintenance area 534 (shown with a broken UAV 535 therein). In some embodiments, the flight coordinator 502 may further determine a battery level of the UAV 506 which may optionally include a range estimate. For example, UAV 506 may report to flight coordinator 502 as follows: "Battery Level=39%; Estimated Range=7.8 miles (roundtrip)." Accordingly, the flight coordinator 502 may provide UAV 506 with an appropriate assignment for a healthy UAV with a battery level of 39% and/or estimated flight range of 7.8 miles. In some embodiments, the flight coordinator 502 may search an order database to determine whether there are any currently pending deliveries which are within the estimated flight range of 7.8 miles (optionally with an added margin of safety) and, if there are, the flight coordinator 502 may provide the UAV 506 an assignment to pick up the corresponding cargo and make the delivery. Alternatively, if there are no currently pending deliveries which are within the estimated flight range of UAV 506 (or if the battery level is below a predetermined level), the flight coordinator 502 may determine that the battery level is below a battery threshold and provide an assignment including an instruction to report to refueling station 536 for battery charging (shown with a low-charge UAV 537 therein). It should be appreciated that the battery threshold may be either static (e.g., "Battery Level=15%; Estimated Range=3.0 miles (roundtrip)") and/or dynamic in which case the flight coordinator 502 sets the threshold based on one or more currently pending deliveries which have not already been assigned to a different UAV.

In some embodiments, the flight coordinator 502 may inspect or cause inspection of a reusable container, which is used for enclosing the cargo during delivery, for potential security risks to the FC. For example, a malicious third party may enclose an unwanted item (e.g. a smoke bomb, a camera, etc.) within the reusable container in an attempt to gain access to and/or harass the FC. In various embodiments, the inspection may include running the reusable container through an x-ray machine, e.g. an x-ray machine may be disposed adjacent to an ingress conveyance system. Additionally, in various embodiments, the inspection may include weighing the reusable container with and/or without the weight of the UAV. For example, the UAV may deposit the reusable container onto a scale and/or the UAV may land upon a scale while holding the reusable container (e.g. because a UAV may use a battery power source rather than a fuel source of which the weight is substantially reduced by use such as fossil fuels the reusable container weight may be deduced by subtracting the known weight of the UAV from the combined weight). Based at least on the foregoing, it should be appreciated that the flight coordinator may also provide a UAV which has completed a delivery assignment with a pickup assignment to pick up, and return to the FC, a reusable container used to complete a previous delivery.

Figure 6:
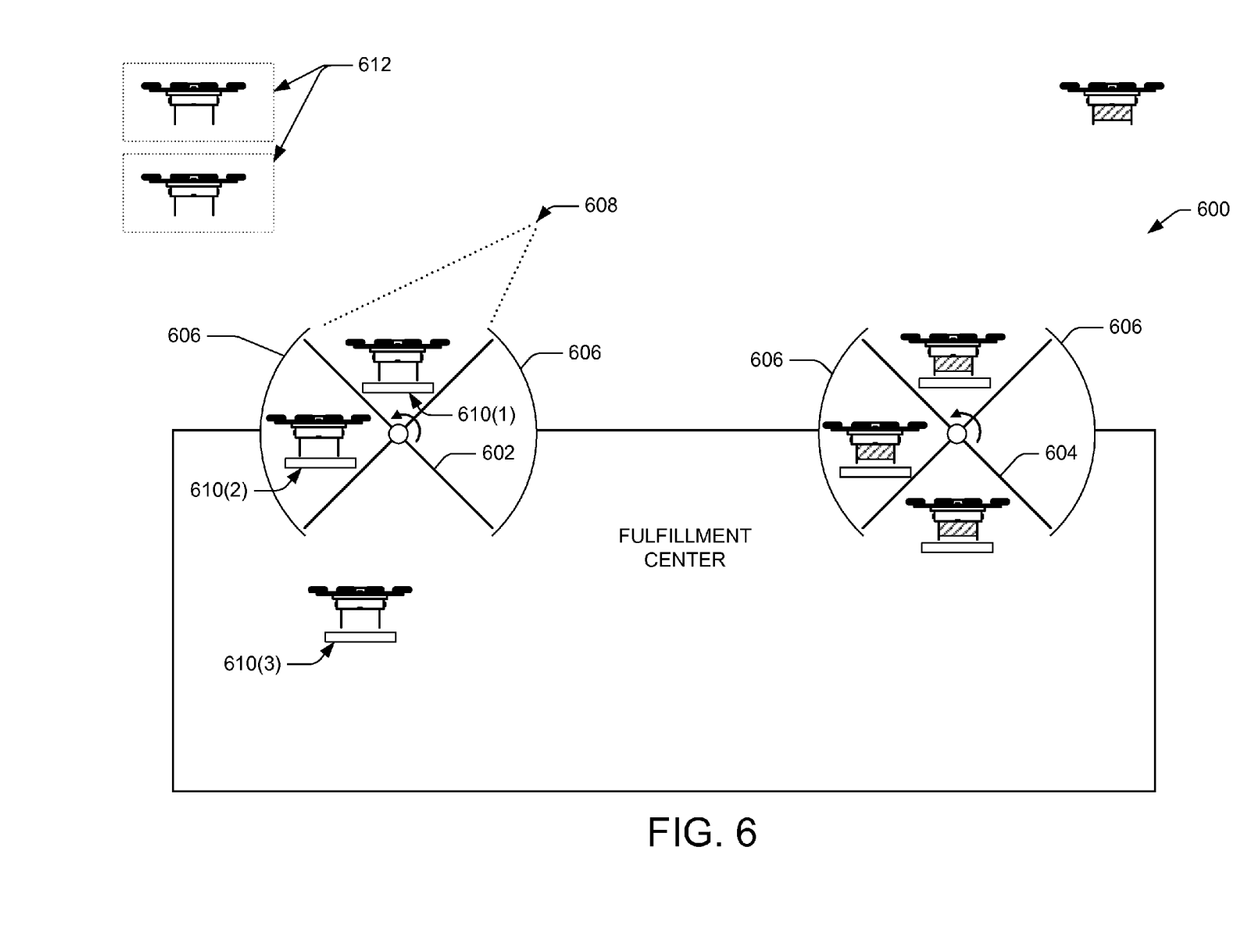
FIG. 6 is a schematic diagram of an illustrative UAV egress and ingress system to provide both continuous egress for departing UAVs and ingress for returning UAVs while allowing minimal exposure of an interior of the FC.

FIG. 6 is a schematic diagram of an illustrative UAV Egress and Ingress system to provide continuous egress for departing UAVs and ingress for returning UAVs while allowing minimal exposure of the FC interior. As shown in FIG. 6, the system 600 may include one or more revolving-type doors 602, 604 which enable continuous egress and ingress from the FC by a plurality of UAVs while minimizing unwanted exposure to the interior of the FC. In such embodiments, the revolving-type door may be enclosed in one or more shields 606 (shown 4×), e.g. partial circular shaped shields which cover a portion of the revolving door 602, 604, which prevent exposure such as a line of sight from the exterior of the FC at all times during its continuous operation. For example, industrial spy is unable to view into the FC past the combination of the door 602 and the shields 606. In such embodiments, the revolving-type door may include a constantly horizontal platform 610 shown at 3 positions, e.g. a platform which hangs from a rotational axis to remain horizontal, upon which an egressing UAV may rest until cleared for take-off and/or in ingressing UAV may land to be carried into the FC, e.g. as shown at position 610(3). As ingressing UAVs await for an open platform to land upon, the ingressing UAVs may enter and wait in one or more ingress staging areas 612 in which the UAVs may hover and/or land to conserve energy. FIG. 6 is included to disclose physical details of this particular embodiments. It should be appreciated that details and/or features disclosed in relation to other embodiments may be practiced with details and/or features of the embodiment of FIG. 6.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, various embodiments disclosed herein have included swing-type doors, revolving-type doors, and/or rotating-type doors; however, it should be appreciated that any suitable door is within the scope of this disclosure such as, for example, sliding-type pocket doors.

What is claimed is:

1. A method comprising:
   establishing a communication link with an unmanned aerial vehicle (UAV) to execute an automated egress from a fulfilment center (FC);
   uploading to the UAV, via the communication link, an egress assignment including an instruction to exit the FC through a launch bay aperture between an interior of the FC and an exterior of the FC;
   receiving an indication, via the communication link, that the UAV has entered an egress staging area within the FC, the egress staging area being proximate to the launch bay aperture;
   in response to the indication, causing the launch bay aperture to change from a closed state to an open state to enable the UAV to egress the FC through the launch bay aperture;
   determining that the UAV has egressed the FC through the launch bay aperture; and
   in response to the determining, causing the launch bay aperture to return to the closed state to secure the FC.

2. The method of claim 1, further comprising:
   prior to the causing the launch bay aperture to change from the closed state to the open state, causing a shield to move from a first position to a second position to block viewing of the interior of the FC from one or more points of view from the exterior of the FC.

3. The method of claim 1, wherein the causing the launch bay aperture to change from the closed state to the open state occurs contemporaneously with at least one of:
   the UAV being propelled toward the launch bay aperture by a force generated external to the UAV; or
   the UAV flying toward the launch bay aperture.

4. The method of claim 1, further comprising:
   verifying, via the communication link, that the UAV has passed a pre-flight inspection to ensure that the UAV is currently capable of delivering the cargo;
   determining, via the communication link, whether UAV has received delivery instructions associated with the cargo, the delivery instructions including at least a drop-off location for the cargo; and
   in response to determining that the UAV has not received delivery instructions associated with the cargo, providing delivery instructions to the UAV.

5. The method of claim 1, further comprising establishing a second communication link with a second UAV to execute an automated ingress into the FC, the automated ingress comprising verifying that the second UAV is permitted to access the interior of the FC.

6. The method of claim 5, further comprising:
   receiving a notification, via the second communication link, that the second UAV has landed upon an ingress conveyance, at least a portion of the ingress conveyance being exterior to the FC; and
   in response to the notification, causing the ingress conveyance to transport the second UAV from the exterior of the FC to the interior of the FC.

7. An unmanned aerial vehicle (UAV) flight coordinator, comprising:
   one or more processors; and
   one or more computer readable media storing instructions that are executable by the one or more processors to perform acts comprising:
      establishing a first communication link with a first UAV, the first UAV being loaded with a cargo to be transported to a delivery location;
      causing a first launch bay aperture located between an interior of a fulfillment center (FC) and an exterior of the FC to change from a closed state to an open state;
      providing, to the first UAV, an egress assignment including an instruction to exit the FC through the first launch bay aperture;
      determining that the first UAV has completed the egress assignment;
      in response to determining that the first UAV has completed the egress assignment, causing the first launch bay aperture to change from the open state to the closed state;
      determining that a second UAV is permitted to access the interior of the FC;
      in response to determining that the second UAV is permitted to access the interior of the FC, causing a second launch bay aperture located between the interior of the FC and the exterior of the FC to change from the closed state to the open state;
      providing, to the second UAV, an ingress assignment including an entry instruction to enter the FC through the second launch bay aperture;
      determining that the second UAV has completed the ingress assignment; and
      in response to determining that the second UAV has completed the ingress assignment, causing the second launch bay aperture to return from the open state to the closed state.

8. The UAV flight coordinator of claim 7, further comprising a UAV identification module to receive at least one of identification information corresponding to the first UAV and identification information corresponding to the second UAV, wherein the act of determining that the second UAV is permitted to access the interior of the FC is based at least in part on the identification information corresponding to the second UAV.

9. The UAV flight coordinator of claim 7, wherein before causing the first launch bay aperture to change from the closed state to the open state the acts further comprise:
providing, to a plurality of UAVs including the first UAV, an egress staging assignment including an instruction to enter into an egress staging area;
determining that each UAV of the plurality of UAVs is standing by in the egress staging area in accordance with the egress staging assignment; and
in response to determining that each UAV is standing by in the egress staging area, providing a plurality of egress assignments to the plurality of UAVs including instructions to exit the FC.

10. The UAV flight coordinator of claim 7, the acts further comprising:
establishing a plurality communication links with a plurality of UAVs, the plurality of UAVs including at least one of UAVs executing the egress assignment and UAVs executing an ingress assignment;
determining a physical location and direction of travel associated with each of the plurality of UAVs; and
providing to at least some of the plurality of UAVs, via a corresponding communication link, information associated with a specific flight corridor to travel within.

11. The UAV flight coordinator of claim 7, the acts further comprising inspecting a reusable container, used for enclosing the cargo during delivery, for potential security risks.

12. The UAV flight coordinator of claim 7, the acts further comprising:
receiving retail order information associated with the cargo to be transported to the delivery location; and
providing, to the first UAV, a delivery assignment including a delivery instruction to deliver the cargo to particular geographical coordinates corresponding to the delivery location.

13. The UAV flight coordinator of claim 7, the acts further comprising:
receiving an indication that the second UAV has landed upon an ingress conveyance, at least a portion of the ingress conveyance being exterior to the FC, wherein the second UAV is returning from a delivery assignment;
verifying that the second UAV is permitted to access the interior of the FC;
based at least partially on the verifying, causing a second launch bay aperture, between the interior of the FC and the exterior of the FC, to change from an ingress closed state to an ingress open state;
causing the ingress conveyance to transport the second UAV from the exterior of the FC to the interior of the FC; and
causing the second launch bay aperture to return to the ingress closed state after the UAV has been transported to the interior of the FC.

14. The UAV flight coordinator of claim 13, wherein prior to landing on the ingress conveyance, the second UAV locates an available one of a plurality of designated landing locations, each of the plurality of designated landing locations being identifiable by the second UAV by use of one or more sensors.

15. An unmanned aerial vehicle (UAV) flight coordinator, comprising:
one or more processors; and
one or more computer readable media storing instructions that are executable by the one or more processors to perform acts comprising:
establishing a first communication link with a first UAV, the first UAV being loaded with a cargo to be transported to a delivery location;
causing a first launch bay aperture located between an interior of a fulfillment center (FC) and an exterior of the FC to change from a closed state to an open state;
providing, to the first UAV, an egress assignment including an instruction to exit the FC through the first launch bay aperture;
determining that the first UAV has completed the egress assignment;
in response to determining that the first UAV has completed the egress assignment, causing the first launch bay aperture to change from the open state to the closed state;
establishing a plurality communication links with a plurality of UAVs, the plurality of UAVs including at least one of UAVs executing the egress assignment and UAVs executing an ingress assignment;
determining a physical location and direction of travel associated with each of the plurality of UAVs; and
providing to at least some of the plurality of UAVs, via a corresponding communication link, information associated with a specific flight corridor to travel within.

16. The UAV flight coordinator of claim 15, the acts further comprising determining that a second UAV is permitted to access the interior of the FC,
wherein the UAV flight coordinator further comprises a UAV identification module to receive at least one of identification information corresponding to the first UAV and identification information corresponding to the second UAV, and
wherein the act of determining that the second UAV is permitted to access the interior of the FC is based at least in part on the identification information corresponding to the second UAV.

17. The UAV flight coordinator of claim 15, wherein before causing the first launch bay aperture to change from the closed state to the open state the acts further comprise:
providing, to a plurality of UAVs including the first UAV, an egress staging assignment including an instruction to enter into an egress staging area;
determining that each UAV of the plurality of UAVs is standing by in the egress staging area in accordance with the egress staging assignment; and
in response to determining that each UAV is standing by in the egress staging area, providing a plurality of egress assignments to the plurality of UAVs including instructions to exit the FC.

18. The UAV flight coordinator of claim 15, the acts further comprising:
receiving retail order information associated with the cargo to be transported to the delivery location; and
providing, to the first UAV, a delivery assignment including a delivery instruction to deliver the cargo to particular geographical coordinates corresponding to the delivery location.

19. The UAV flight coordinator of claim 15, the acts further comprising:
receiving an indication that a second UAV has landed upon an ingress conveyance, at least a portion of the ingress conveyance being exterior to the FC, wherein the second UAV is returning from a delivery assignment;

verifying that the second UAV is permitted to access the interior of the FC;

based at least partially on the verifying, causing a second launch bay aperture, between the interior of the FC and the exterior of the FC, to change from the closed state to the open state;

causing the ingress conveyance to transport the second UAV from the exterior of the FC to the interior of the FC; and causing the second launch bay aperture to return to the closed state after the UAV has been transported to the interior of the FC.

20. The UAV flight coordinator of claim 19, wherein prior to landing on the ingress conveyance, the second UAV locates an available one of a plurality of designated landing locations, each of the plurality of designated landing locations being identifiable by the second UAV by use of one or more sensors.

\* \* \* \* \*